United States Patent [19]

Wenz, Jr.

[11] Patent Number: 4,999,018

[45] Date of Patent: Mar. 12, 1991

[54] DRILL CHUCK KEY BEARING

[76] Inventor: Otto D. Wenz, Jr., Rte. 1, Box 70-A, Tekamah, Nebr. 68061

[21] Appl. No.: 557,947

[22] Filed: Jul. 25, 1990

[51] Int. Cl.$^5$ .............................................. B23B 31/06
[52] U.S. Cl. .................................... 408/241 R; 81/16; 279/1 K
[58] Field of Search ............................ 408/241 R, 240; 279/1 K; 81/1 G

[56] References Cited

U.S. PATENT DOCUMENTS

| | | | |
|---|---|---|---|
| 4,123,195 | 10/1978 | Purviance | 408/241 R |
| 4,386,879 | 6/1983 | Martinmaas | 408/241 R |
| 4,389,146 | 6/1983 | Coder | 408/240 |
| 4,615,653 | 10/1986 | Watson | 408/241 R |

FOREIGN PATENT DOCUMENTS

| | | | |
|---|---|---|---|
| 657921 | 4/1979 | U.S.S.R. | 279/1 K |
| 1281348 | 1/1987 | U.S.S.R. | 279/1 K |

Primary Examiner—William Briggs
Attorney, Agent, or Firm—Zarley, McKee, Thomte, Voorhees & Sease

[57] ABSTRACT

A drill chuck key bearing includes an elongated support member having a pair of legs pivotally connected to the opposing ends thereof. The support member has an aperture therethrough, through which the shank of a drill chuck key is rotatably and slidably mounted. The legs have their free ends bent towards one another so as to engage a pair of opposing apertures in the drill chuck when the key is engaged with the drill chuck.

6 Claims, 3 Drawing Sheets

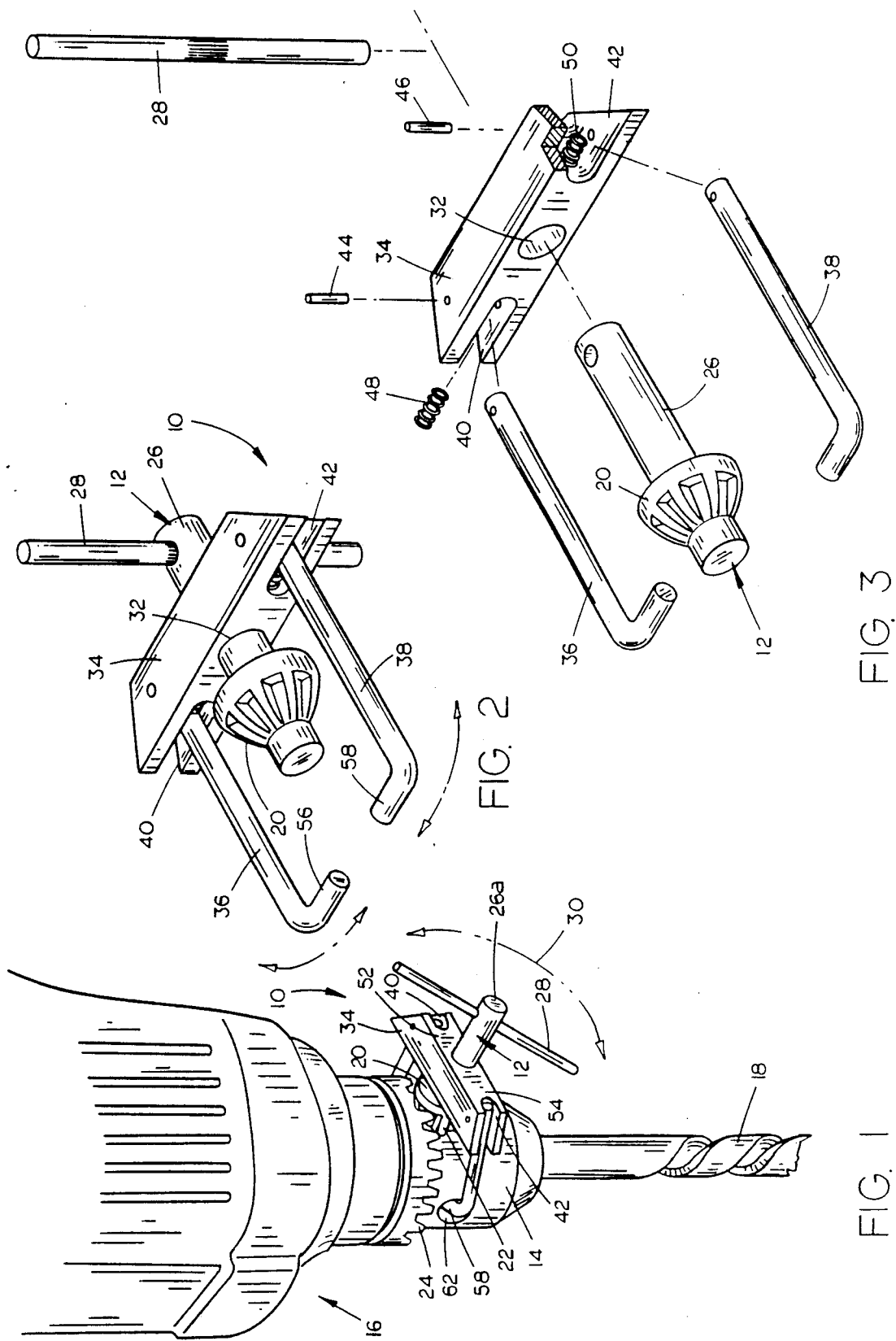

4,999,018

DRILL CHUCK KEY BEARING

TECHNICAL FIELD

The present invention relates generally to drill chuck keys, and more particularly to a device for retaining the drill chuck key in locked relation on a drill chuck.

BACKGROUND OF THE INVENTION

Drill chuck keys are provided with a short projection which acts as a bearing when inserted in an aperture in a drill chuck. Once this short projection is inserted, the teeth on the key mesh with the teeth on the chuck so as to tighten or loosen a drill bit within the chuck.

One of the most frustrating problems involved with drills, is fastening the drill bit within the drill chuck and tightening the chuck to the appropriate degree. After a short period of use, the teeth on drill chuck keys as well as the teeth on the chucking gear frequently become worn, and thus will slip as the user attempts to tighten or loosen the drill chuck.

Because the projection on the key is quite short, it also becomes worn in combination with wear on the teeth, and will not maintain the key teeth and chuck teeth in aligned relation. Thus, wear on the key projection exacerbates wear on the key and chuck teeth.

Another problem which is exacerbated by worn teeth on a key, relates to the capability of applying pressure to fully tighten the drill chuck. It can be annoying and painful to attempt to tighten a drill chuck and have the key slip from the chuck teeth.

It is therefore a general object of the present invention to provide a bearing for a drill chuck key to retain the key in position on the drill chuck.

Another object of the present invention is to provide a drill chuck key bearing which will align the key teeth with the drill chuck teeth and prevent excessive wear on the key teeth, the chuck ring gear and all corresponding components.

A further object of the present invention is to provide a drill chuck key bearing which is quickly and easily locked onto a drill chuck to tighten or loosen the drill chuck.

Still another object is to provide a drill chuck key bearing which may be mounted to a variety of key shapes.

Yet a further object of the present invention is to provide a drill chuck key bearing which is economical to manufacture, simple to use and refined in appearance.

These and other objects of the present invention will be apparent to those skilled in the art.

SUMMARY OF THE INVENTION

The drill chuck key bearing of the present invention includes an elongated support member having a pair of legs pivotally connected to the opposing ends thereof. The support member has an aperture therethrough, through which the shank of a drill chuck key is rotatably and slidably mounted. The legs have their free ends bent towards one another so as to engage a pair of opposing apertures in the drill chuck when the key is engaged with the drill chuck. The legs will thereby retain the key in aligned engaged position during rotation of the key. Preferably, a pair of springs are mounted between the legs and the support member so as to bias the legs away from one another. This forces the free ends of the chuck apertures when the user releases his grip, and helps prevent accidental injury. A pair of stops are mounted on the supporting member and positioned so that the legs are prevented from pivoting outwardly beyond a predetermined distance. Preferably this predetermined distance is only slightly greater than the diameter of the drill chuck.

BRIEF DESCRIPTION OF THE DRAWINGS

FIG. 1 is a pictorial view of the key bearing of the present invention installed on a drill chuck with a key operably mounted therein;

FIG. 2 is an enlarged perspective view of the drill chuck key bearing of the present invention;

FIG. 3 is an exploded perspective view of the bearing of FIG. 2;

DESCRIPTION OF THE PREFERRED EMBODIMENTS

Figure 4:
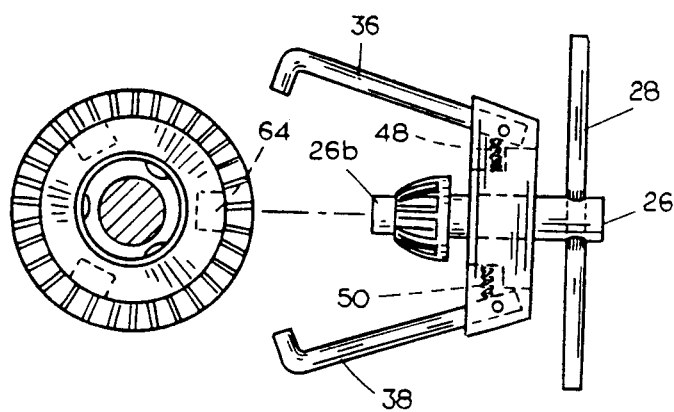
FIG. 4 is an elevational view showing the bearing of the present invention prior to installation on a drill chuck.

Referring now to the drawings, in which similar or corresponding parts are identified with the same reference numeral, and more particularly to FIG. 1, the drill chuck key bearing of the present invention is designated generally at 10 and is designed to hold a drill chuck key 12 in position on a drill chuck 14. In FIG. 1, a drill 16 is shown with a drill bit 18 mounted in chuck 14, with key bearing 10 retaining key 12 in position. A conventional key 12 includes a toothed head 20 having a plurality of teeth 22 thereon which will intermesh with teeth 24 on drill chuck 14. A shank 26 extends from head 20 and has a handle 28 mounted at one end 26a, opposite head 20, so as to rotate head 20 in either direction, as shown by arrow 30.

Referring now to FIG. 2, key 12 is operably mounted in bearing 10 through an aperture 32 in a main support member 34. As shown in FIG. 3, the shank 26 of key 12 may be journaled through aperture 32 by removing handle 28 therefrom. Shank 26 is freely rotatable within aperture 32, to permit operation of the key in chuck 14.

A pair of L-shaped legs 36 and 38 are pivotally mounted within a pair of notches 40 and 42, respectively, in the opposing ends of main support member 34. Legs 36, 38 are mounted on pins 44 and 46, respectively, so as to pivot in the same plane, coplanar with the longitudinal axis of key shank 26. A coil spring 48 is interposed between leg 36 and main support member 34 within notch 40, so as to bias leg 36 on its pivotal axis outwardly away from key head 20. A second spring 50 is similarly interposed between leg 38 and main support member 34 within notch 42, to bias leg 38 outwardly.

Figure 5:
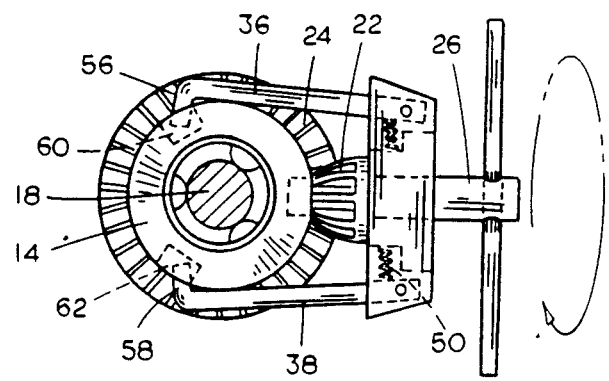
FIG. 5 is an elevational view similar to FIG. 4, with the key bearing of the present invention installed on a drill chuck.

Notches 40 and 42 are formed in main support member 34 with stop portions 52 and 54 (see FIG. 1) located s as to prevent outward pivotal movement of legs 36 and 38, respectively, beyond a predetermined distance. Each leg 36 has a bent end 56 and 58, respectively, bent inwardly towards one another to form L-shaped legs 36 and 38. Stops 52 and 54 are located such that legs 36 and 38 will be biased outwardly to withdraw bent ends 56 and 58 from the corresponding apertures 60 and 62 in drill chuck 14, as is best shown in FIGS. 4 and 5.

Legs 36 and 38 are equal in length, each having a length such that bent ends 56 and 58 will be journaled within chuck apertures 60 and 62, bringing key teeth 22 into intermeshing relation with chuck teeth 24. The identical length of legs 36 and 38 will retain key shank 26 perpendicular to the longitudinal axis of drill bit 18 and drill chuck 14, so as to maintain the alignment of key teeth 22 with chuck teeth 24, and prevent undue wear thereon. Obviously, the tip 26b of shank 26 will bear within chuck aperture 64 in a conventional fashion, as shown in FIGS. 4 and 5. Although not shown in FIGS. 1 and 5, it is necessary for the user to apply pressure to legs 36 and 38 against the biasing force of springs 48 and 50 to retain bent ends 56 and 58 within chuck apertures 60 and 62. This acts as a safety feature, so that bearing 10 and key 12 are immediately released from chuck 14 upon the release of legs 36 and 38 by the user.

Figure 6:
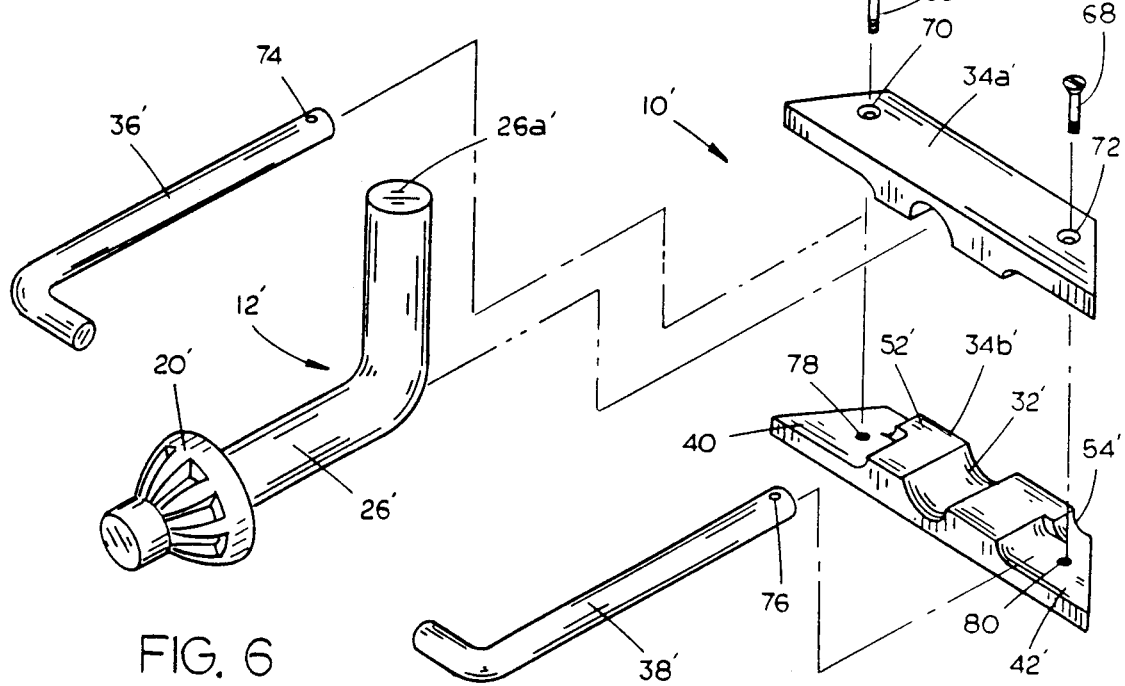
FIG. 6 is an exploded perspective view of a second embodiment of a key bearing.

Referring now to FIG. 6, a second embodiment of the invention is designated generally at 10' and includes a similarly shaped main support member 34' which is split longitudinally into an upper half 34a' and a lower half 34b'. This division of main support member 34 permits the use of bearing 10' on an L-shaped key 12'. Key 12' includes a shank 26' which is bent at one end 26a' into an L-shape. End 26a' then serves as the handle to rotate shank 26' and head 20' in a conventional fashion.

Bearing 10' is mounted on key 12', by locating shank 26' within aperture 32', and then holding upper and lower halves 34a' and 34b' of main support member 34' together. Legs 36' and 38' are then positioned within notches 40' and 42', and threaded screws 66 and 68 are inserted through apertures 70 and 72 in upper half 34a', thence through apertures 74 and 76 in legs 36' and 38', and into threaded apertures 78 and 80 in lower half 34b' of main support member 34. While bearing 10' is shown utilized with an L-shaped key 12', it could also be utilized a conventional T-shaped key 12, as shown in FIGS. 1–5.

Figures 7, 7A:
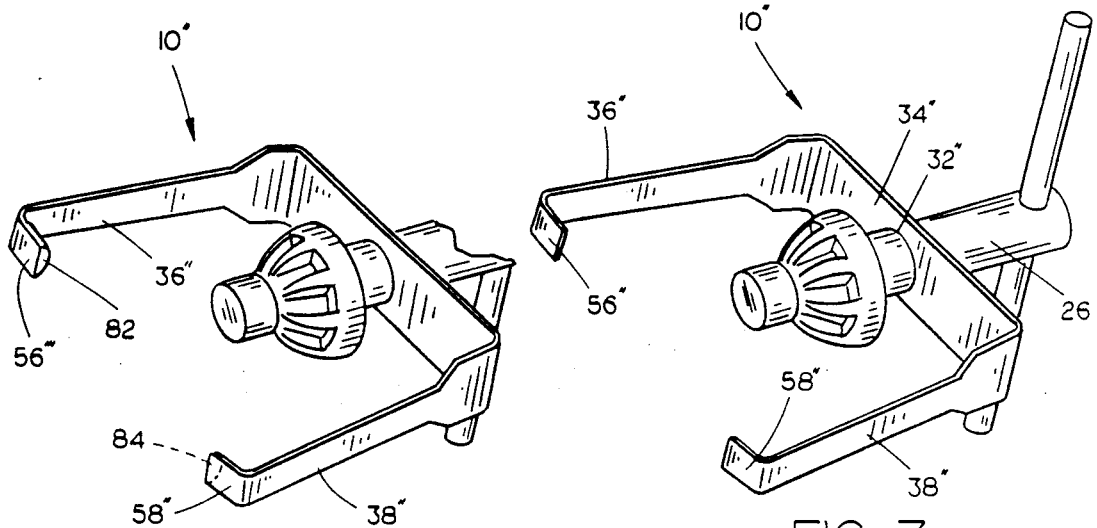
FIG. 7 is an enlarged perspective view of a third embodiment of the invention.
Figure 8:
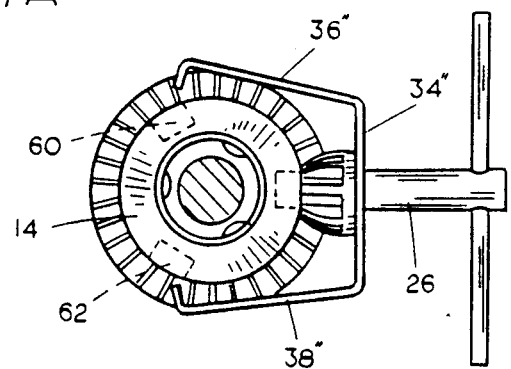
FIG. 8 is an elevational view of the invention of FIG. 7 installed on a drill chuck.
Figure 9:
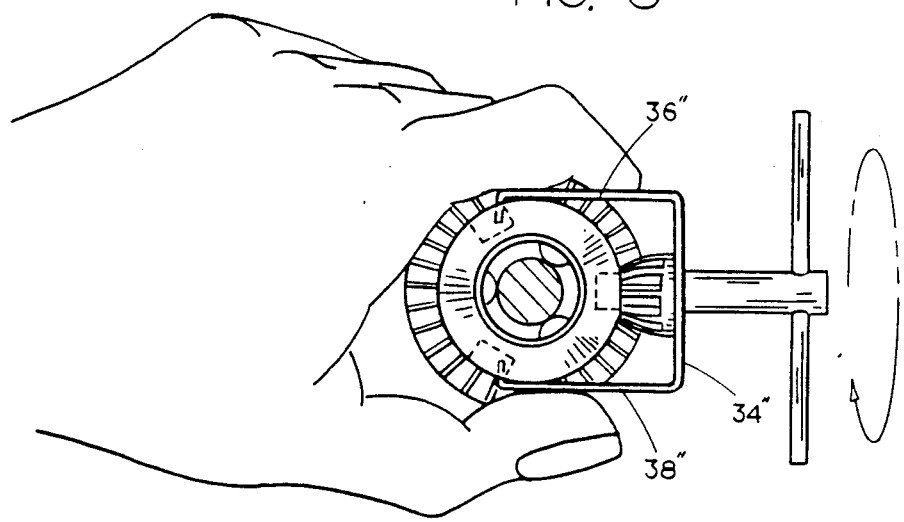
FIG. 9 is an elevational view of the device of FIG. 8 showing operation of the key within the key bearing.

Referring now to FIGS. 7 and 7a, a third embodiment of the bearing is designated generally at 10". Referring specifically to FIG. 7, bearing 10" is a single integral piece of spring steel. Bearing 10" is formed from a single piece of spring steel which is bent to form a main support portion 34", with a pair of legs 36" and 38" projecting therefrom. Preferably, legs 36" and 38" project from main support portion 34" at an obtuse angle, so as to diverge from the longitudinal axis of key shank 26, with bent ends 56" and 58" disposed outwardly from apertures 60 and 62 of drill chuck 14, as shown in FIG. 8. Because bearing 10" is formed of spring steel, legs 36" and 38" may be squeezed so as to engage bent ends 56" and 58" in apertures 60 and 62, as shown in FIG. 9. Releasing legs 36" and 38" will permit the spring steel to return to its original shape, disengaging bent ends 56" and 58".

While bearing 10" is shown with only an aperture 32" through which shank 26 is rotatably journaled, a bearing sleeve (not shown) could be installed to lengthen the life of bearing 10".

FIG. 7a shows a modification of the legs 36" and 38" of bearing 10". In this version, bent ends 56'" and 58'" have an interior rounded surface 82 and 84, respectively, which will more closely conform to apertures 60 and 62 upon engagement with a drill chuck 14.

Whereas the invention has been shown and described in connection with the preferred embodiments thereof, it will be understood that many modifications, substitutions and additions may be made which are within the intended broad scope of the appended claims. Thus, there has been shown and described a drill chuck key bearing which accomplishes at least all of the above-stated objects.

I claim:

1. A bearing for a drill chuck key, said key of the type having a shank, a gear means at a first end of the shank for cooperation with a drill chuck, and a handle means at a second bend for rotating said shank and gear means, said chuck of the type having three equally spaced apertures therearound for receiving the first end of the key, comprising:
    a support member having first and second ends, said support member having an aperture therethrough for rotatably receiving the shank of said key;
    a first leg pivotally connected at one end to the first end of said support member, connected for pivotal movement within a plane that includes the longitudinal axis of the support member aperture;
    a second let pivotally connected at one end to the second end of said support member, connected for pivotal movement within the pivotal plane of said first leg;
    said first and second legs having their free ends bent towards one another to form generally L-shaped legs adapted to be received within opposing apertures in said drill chuck when the first end of the key is aligned with a drill chuck aperture.

2. The bearing of claim 1, wherein said legs are of a length such that said key gear means is engaged with the chuck when said leg bent ends are engaged in opposing chuck apertures.

3. The bearing of claim further comprising stop means on said support member for preventing pivotal movement of said legs away from each other beyond a predetermined distance.

4. The bearing of claim 3, wherein said stop means prevent pivotal movement of the free ends of said legs beyond a distance slightly greater than the diameter of said chuck.

5. The bearing of claim 1, further comprising biasing means on said support member for biasing said legs to pivot away from one another.

6. The bearing of claim 1, wherein said support member is formed of selectively connectable halves, said halves being split through the pivotal plane of said legs such that said support member aperture is bifurcated to receive a key shank.

* * * * *